Dec. 21, 1965   F. McNEILL   3,224,552
FRUIT FEEDING MECHANISM
Filed Oct. 5, 1962
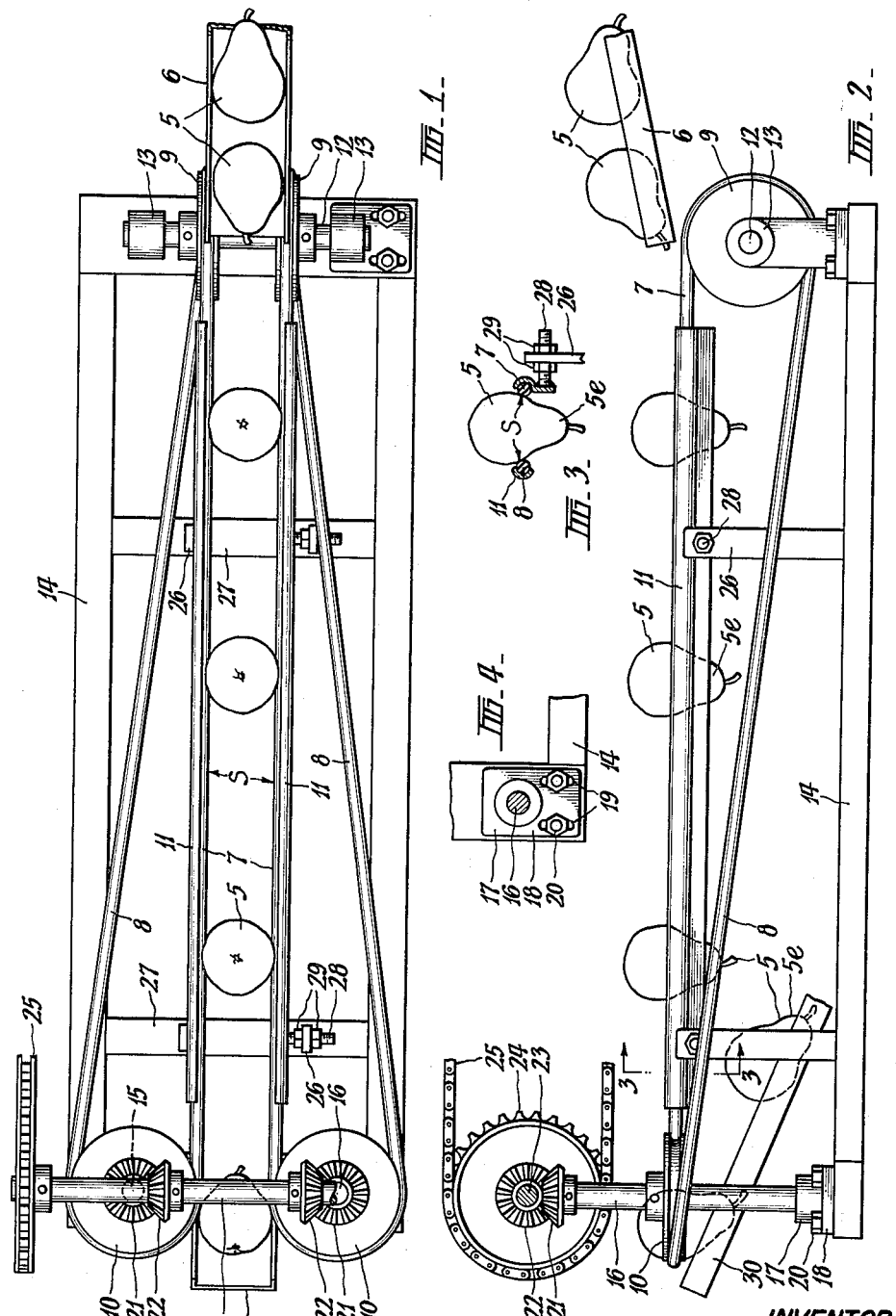
INVENTOR.
FRANCIS McNEILL
BY
Oberlin, Maky & Donnelly
ATTORNEYS

# United States Patent Office 3,224,552
Patented Dec. 21, 1965

3,224,552
FRUIT FEEDING MECHANISM
Francis McNeill, 3 Little Ave., Mooroopna,
Victoria, Australia
Filed Oct. 5, 1962, Ser. No. 228,607
Claims priority, application Australia, Mar. 21, 1962,
15,585/62
4 Claims. (Cl. 198—33)

This invention relates to fruit feeding mechanism and particularly to feeding ob-ovoid fruit such as pears for delivery to processing apparatus.

It is well known that the treatment rate of any fruit processing machine, e.g. a pear coring and peeling machine, is limited to a substantial extent by the rate at which the fruit can be oriented or aligned with the stem end of the fruit in a correct position to be received by the machine for processing.

The principal object of the present invention is to provide an automatic feeding mechanism for ob-ovoid fruit of convenient and relatively simple construction which will enable fruit to be delivered to a processing apparatus in a correctly oriented or aligned position to the processing apparatus at a delivery rate greater than that achieved with previously known feeding mechanisms.

In order that the invention may be more readily understood reference will now be made to the accompanying drawings illustrating a practical embodiment of fruit feeding mechanism constructed in accordance with the present invention. In these drawings:

FIGURE 1 is a plan view of the fruit feeding mechanism;

FIGURE 2 is a side elevation thereof;

FIGURE 3 is an enlarged detail view in section taken on line 3—3 of FIGURE 2; and FIGURE 4 is a detail view of a bearing mounting.

Mechanism for feeding ob-ovoid fruit, such as pears, for delivery to a processing apparatus, according to the present invention, includes means to deliver single fruit in sequence to a position where the fruit is supported and transported by two spaced parallel and substantially horizontal belts moving in the same direction, and with said belts arranged so that during movement of the fruit by the belts the fruit is automatically oriented or aligned by being suspended between the belts in a substantially vertical position with the stem end lowermost for subsequent delivery of the fruit with stem end foremost and in sequence to a processing apparatus.

The belts are preferably of circular cross-section and made of rubber or like resilient material to avoid damage of the fruit. The space between the belts may be adjusted to enable fruit of various grade sizes to be fed through the mechanism.

In a preferred arrangement the belts at the fruit delivery end, are each carried on pulleys mounted in a plane normal to the plane of movement of the fruit so that as the belts diverge from the parallel in return around the pulleys to release or deliver the oriented or aligned fruit, the latter by reason of the change of point of support on the diverging belts is caused to incline from the vertical towards the direction of movement and in which position the fruit is received in sequence, stem forward, by a chute or other transfer means to deliver the fruit to a processing apparatus.

The mechanism illustrated in the drawings shows one practical embodiment of the invention for feeding pears to a peeling or coring machine which is not illustrated, as the subsequent processing apparatus forms no part of the present invention. The pears 5 are fed from a suitable bulk supply (not shown) in sequence and in any position down an inclined V-section chute 6 of any suitable and known construction and may be vibrated in known manner to keep the fruit progressing in the chute. It is pointed out that any suitable feeding means may be employed provided the pears are fed in sequence to a delivery point.

From the chute 6 the pears 5 are delivered to be received between and supported by two parallel and horizontal or substantially horizontal runs 7 of belts 8 which move at equal or approximately equal speeds. The belts 8 are of circular cross-section and made of rubber or like resilient material to avoid or prevent damage to the pears 5 whilst being transported by said belts.

The space S between the belts 8 is arranged to be such that the body of each pear 5 is supported by the belts just below the maximum diameter of the pear so that as they are moved from the point of reception by the belts the pears move to a vertical position with the stem ends 5e downward.

The travelling belts 8 are each supported on vertical idler pulleys 9 at the pear receiving end and at the other end are each carried on horizontally disposed driving pulleys 10 so that the belts 8 diverge, relatively to each other, around the pulleys 10 for the return to their respective idler pulleys 9.

The runs 7 of the belts 8 are supported in half round tracks 11 to maintain the belts in parallelism and one track 11 is arranged to be adjustable so that the space S between the belts may be adjustable to support pears of various grade sizes.

The pulleys 9 are supported on a common horizontal shaft 12 supported in bearings 13 which are carried on the ends of a rectangular frame 14. The belt driving pulleys 10 are supported on vertical shafts 15 and 16 respectively supported in bearings 17 carried on the other end of the frame 14. The bearing 17 for the pulley shaft 16 is provided with a base 18 having slots 19 to receive the securing bolts 20, the arrangement permitting the shaft 16 to be transversely adjusted according to the adjustment of the associated belt track 11.

At the upper ends of each of the pulley shafts 15 and 16 is a bevel pinion 21 each of which engages a driving bevel pinion 22 carried on a driving shaft 23 which is drive coupled through sprocket 24 and chain 25 to an electric motor (not shown) or a driving source on the processing apparatus with which the mechanism is operating.

The belt tracks 11 are supported on brackets 26 carried on transverse members 27 of the frame 14. The adjustable track 11 has fixed thereto threaded studs 28 which are held in adjusted position by lock nuts 29. Upon adjustment of the track 11 on each supporting bracket 26 the associated driving pulley 10 is also adjusted by means of adjustment of its shaft bearing 17 and bevel pinion 22 is adjusted on its shaft 23. Similarly the associated idler pulley 9 is adjusted on its shaft 12.

The graded pears 5 on being delivered by chute 6 onto the belts 8 are supported thereby and transported thereon and during this movement are oriented or aligned into a vertical position by reason that the belts are spaced apart a distance S, which is slightly smaller than the maximum diameter of the graded pears, so that the pears are virtually suspended between the belts and the stem ends 5e will fall between the belts and the pears will assume a vertical position.

On each pear reaching the point where the belts 8 diverge from each other around the driving pulleys 10 the point of contact of the belts with the body of the pear will change in that the point of contact will be rearwardly of the centre of gravity of the pear to thereby effect a turning movement so that the stem end 5e of the pear will incline towards its direction of travel as it is released from engagement with the belts.

Each of the pears, at this point, are delivered (with the stem end rearwardly inclined) into a delivery chute 30 so that each pear is passed therein with the stem end 5e forward in respect of the direction of movement in the chute 30. The pears may be delivered from the chute 30 into a pear processing machine or may be delivered directly by the belts 8 into fruit receiving mechanism of the processing machine.

It has been found that the fruit feeding mechanism, as above described, will operate to feed pears in a correctly oriented or aligned position at a greater rate than any previously known mechanism with practically no fruit incorrectly aligned.

It is apparent that various forms of delivery mechanism may be used for feeding fruit to the aligning belts or for transferring the aligned fruit from the belts to any subsequent processing apparatus and that various drive means and adjusting means for spacing the belts may be employed without departing from the present invention which essentially resides in supporting and transporting the fruit on two parallel moving belts to ensure that the ob-ovoid fruit will assume a stem down position from which oriented or aligned position subsequent handling or processing can be readily effected.

What I claim is:

1. Apparatus for advancing objects of ob-ovoid configuration comprising conveying means movable along a substantially closed path, said conveying means being spaced apart to support the large end of such objects on opposite sides thereof, driving means for said conveying means, said driving means being spaced apart sufficiently to gradually separate further said conveying means to discharge such objects therefrom with the large ends positioned facing the direction of travel of said conveying means, and receiving means at the discharge end of said conveying means positioned downwardly and rearwardly with respect to said conveying means.

2. The apparatus of claim 1 in which said conveying means comprises a pair of parallel belts.

3. The apparatus of claim 1 in which said driving means comprise end pulleys rotatable about parallel axes perpendicular to a plane containing the conveying runs of said conveying means.

4. Apparatus for advancing objects of ob-ovoid configuration comprising conveying means movable along a substantially closed path, said conveying means being spaced apart to support the large end of such objects on opposite sides thereof and comprising a pair of parallel belts, end pulleys for said belts rotatable about parallel axes perpendicular to a plane containing the parallel conveying runs of said conveying means, and receiving means at the discharge end of said conveying means positioned downwardly and rearwardly with respect to said conveying means

References Cited by the Examiner

UNITED STATES PATENTS

| 277,488 | 5/1883 | Husted | 209—102 X |
| 817,509 | 4/1906 | Northrup | 198—45 X |
| 1,476,936 | 12/1923 | Walden | 198—190 |
| 2,252,498 | 8/1941 | Flaws | 198—33 X |
| 2,945,335 | 7/1960 | Nicolle | 221—156 X |
| 3,086,822 | 4/1963 | Fibish | 193—43 X |

FOREIGN PATENTS 75,935  11/1949  Norway.

SAMUEL F. COLEMAN, Primary Examiner.

EDWARD A. SROKA, Examiner.